United States Patent
Loop et al.

(10) Patent No.: US 7,924,278 B2
(45) Date of Patent: Apr. 12, 2011

(54) REAL-TIME GPU RENDERING OF PIECEWISE ALGEBRAIC SURFACES

(75) Inventors: Charles T. Loop, Seattle, WA (US); James F. Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 11/495,246

(22) Filed: Jul. 28, 2006

(65) Prior Publication Data

US 2008/0024490 A1 Jan. 31, 2008

(51) Int. Cl.
G06T 17/20 (2006.01)
G06T 15/00 (2011.01)

(52) U.S. Cl. ......................... 345/423; 345/419

(58) Field of Classification Search .................. None
See application file for complete search history.

(56) References Cited

U.S. PATENT DOCUMENTS

| | | | |
|---|---|---|---|
| 5,379,370 A * | 1/1995 | Allain et al. ................ | 345/422 |
| 5,602,979 A | 2/1997 | Loop | |
| 5,680,525 A | 10/1997 | Sakai et al. | |
| 5,945,996 A | 8/1999 | Migdal et al. | |
| 5,999,188 A | 12/1999 | Kumar et al. | |
| 6,462,738 B1 | 10/2002 | Kato | |
| 6,611,267 B2 | 8/2003 | Migdal et al. | |
| 6,646,639 B1 * | 11/2003 | Greene et al. ................ | 345/422 |
| 6,867,769 B1 | 3/2005 | Toriya et al. | |
| 6,879,324 B1 | 4/2005 | Hoppe | |
| 6,888,544 B2 | 5/2005 | Malzbender et al. | |
| 6,900,810 B1 * | 5/2005 | Moreton et al. .............. | 345/522 |
| 6,906,718 B1 | 6/2005 | Papakipos et al. | |
| 6,930,682 B1 * | 8/2005 | Livingston .................... | 345/420 |
| 6,940,503 B2 | 9/2005 | Vlachos et al. | |
| 7,034,823 B2 | 4/2006 | Dunnett | |
| 2002/0015055 A1 | 2/2002 | Foran | |
| 2005/0007369 A1 | 1/2005 | Cao et al. | |

OTHER PUBLICATIONS

Sebastian Enrique, Real-Time Rendering Using CUReT BRDF Materials with Zernike Polynomials, Spring 2004.*
Chen-Chau Chu & Alan C. Bovik, Visible Surface Reconstruction via Local Minimax Approximation, Jul. 14, 1987, Pattern Recognition, vol. 21, 303-312.*
Guo, B. 1995. Quadric and cubic bitetrahedral patches. The Visual Computer 11, 5, 253-262.*
Sederberg, T. W. and Zundel, A. K. 1989. Scan line display of algebraic surfaces. In Proceedings of the 16th Annual Conference on Computer Graphics and interactive Techniques SIGGRAPH '89. ACM, New York, NY, 147-156.*
Fok, Kenny- "Programming Support for Tensor Product Blossoming", University of Waterloo Waterloo, Ontario, Canada N2L 3G1, Aug. 20, 1996.*
Botsch, M., Spernat, M., and Kobbelt, L. 2004. Phong splatting. In Proc. Eurographics Symposium on Point-Based Graphics 2004.*

(Continued)

Primary Examiner — Daniel F Hajnik

(57) ABSTRACT

Surfaces defined by Bézier tetrahedron are generated on programmable graphics hardware. Custom programmed vertex processing, performed by either the CPU or the GPU includes the computation of a symmetric tensor and the assignment of the unique elements of the computed symmetric tensor as vertex attribute data. The vertex attribute data is interpolated by the graphics hardware and output to custom programmed pixel processing. The pixel processing uses the interpolated vertex attribute data to reconstruct, at each pixel, the symmetric tensor which enables the determination of the roots of the polynomial defining the surface to be generated. If no real roots exist, the pixel processing can exit early. If the roots of the polynomial exist, the smallest root can be used as the basis for computing a normal to a point on the surface being rendered, enabling the determination of the color and depth of that pixel.

20 Claims, 7 Drawing Sheets

OTHER PUBLICATIONS

International Search Report PCT/US2007/013337, dated Nov. 9, 2007, pp. 1-7.

Rossel, et al., "Visualization of Volume Data with Quadratic Super Spline", Max-Planck-Institute, Apr. 2003, pp. 1-8.

Eberly, "Quadratic Interpolation of Meshes", Geometric Tools, Inc., Mar. 2, 1999. pp. 1-17.

Gelb et al., "Image-Based Lighting for Games", Hewlett-Packard Company 2004, available at http://www.hpl.hp.co.uk/techreports/2004/HPL-2004-225.pdf.

Bajaj, C. 1997. Implicit surface patches. In Introduction to Implicit Surfaces, Morgan Kaufman, J. Bloomenthal, Ed., 98-25.

Bangert, C., and Prautzsch, H. 1999. Quadric splines. Computer Aided Geometric Design 16, 6, 497-525.

Blythe, D. Jul. 2006. The Direct3D 10 System. ACM Transactions on Graphics. Siggraph Conference Proceedings.

Farouki, R. T., and Rajan, V. T. 1987. On the numerical condition of polynomials in berntein form. Computer Aided Geometric Design 4, 191-216.

Farouki, R. T., and Rajan, V. T. 1988. Algorithms for polynomials in bernstein form. Computer Aided Geometric Design 5, 1-26.

Hadwiger, M., Sigg, C., Scharsach, H., B Uhler, K., and Gross, M. 2005. Real-time ray-casting and advanced shading of discrete isosurfaces. In Eurographics, Blackwell Publishing, M. Alexa and J. Marks, Eds., vol. 24.

Heckbert, P. 1984. The mathematics of quadric surface rendering and soid. Tech. Rep. 3-D Technical Memo 4, New York Institute of Technology. available from: www-2.cs.cmu.edu/~ph.

Herbison-Evans, D. 1995. Solving quartics and cubics for graphics. In Graphics Gems V. , AP Professional, Chestnut Hill MA.

Loop, C., and Blinn, J. 2005. Resolution independent curve rendering using programmable graphics hardware. ACM Transactions on Graphics 24,3 ,1000-1009. Siggraph Conference Proceedings.

Mahl, R. 1972. Visible surface algorithms for quadric patches. IEEE Trans. Computers (Jan.), 1-4.

Ramshaw, L. 1989. Blossoms are polar forms. Computer Aided Geometric Design 6, 4 (November), 323-358.

Sederberg, T. 1985. Piecewise algebraic surface patches. Computer Aided Geometric Design 2, 1-3, 53-60.

Shirley, P., and Tuchman, A. A. 1990. Polygonal approximation to direct scalar volume rendering. In Proceedings San Diego Workshop on Volume Visualization, Computer Graphics, vol. 24, 63-70.

Gelb, Dan, et al., "Image-Based Lighting for Games", http://www.hpl.hp.co.uk/techreports/2004/HPL-2004-225.pdf, 2004.

Gustavson, Stefan, "Beyond the pixel: towards infinite resolution textures", http://staffwww.itn.liu.se/~stegu/GLSL-conics/GLSL-conics.pdf, 2006.

Loop, Charles, et al., "Real-Time GPU Rendering of Piecewise Algebraic Surfaces", ACM Transactions on Graphics (TOG), Jul. 2006, vol. 25, Issue 3, ACM Press New York, NY, USA.

Malzbender, Tom, et al., "Polynomial Texture Maps", http://www.hpl.hp.com/research/ptm/papers/ptm.pdf, 2001.

\* cited by examiner

REAL-TIME GPU RENDERING OF PIECEWISE ALGEBRAIC SURFACES

BACKGROUND

Graphics hardware and, more specifically, graphics processing units ("GPUs"), employ a processing sequence that operates on, and is based on, polygonal primitives. Commonly, such polygonal primitives are triangles, with the surfaces of the objects being imaged by graphics display hardware being represented as a mesh of triangles. In one implementation, the surface is densely sampled, forming many small triangles. An alternative approach uses a lower density mesh. While both of these approaches work, the first wastes resources if the surface is viewed from a distance, and the second introduces sampling artifacts when the surface is viewed up close.

Arbitrarily complex geometric shapes can be represented using compact descriptions. For example, a cube object can be represented as a polygonal representation comprising a list of eight vertexes and six sides, or, even more compactly, a cube object can be represented as the output of a cube-generating procedure, whose inputs are position coordinates and size. A more common example, often used by illustration programs, is the representation of curves according to Bézier control points, allowing a complex curved path to be mathematically described with only a few data points.

Current GPU processing, however, relegates such geometric representations to the prerasterization stages. The surfaces to be displayed are, instead, expanded into polygons, such as triangles, which are then provided to the transformation and setup stages of the processing sequence performed by the GPU. In using triangles to approximate a surface, level-of-detail ("LOD") management becomes significant. Specifically, LOD is used to avoid under-sampling, or tessellation, artifacts when a curved surface is viewed up close, and to avoid wasting resources when a densely triangulated surface is viewed from far away. LOD management can be especially difficult, however, when dealing with changes in resolution when zooming in on shapes and any error results in either a waste of resources, which is often perceived by the user as slowness, or tessellation, which is perceived by the user as an image that lacks sharpness and detail.

SUMMARY

A surface to be generated by graphics hardware can be defined by a collection of Bézier tetrahedra, where each tetrahedron defines a volume of space containing the surface to be generated. The surface can then be rendered in a piecemeal fashion by evaluating, within the boundaries of each tetrahedron, the function that defines the surface. To generate the two-dimensional image of the surface, the vertices of each tetrahedron can be defined and processed, providing the framework from-which each pixel, or other quantum of a display, can be determined and generated.

Recently, graphics hardware (including the GPU and attendant graphics-specific memory) has become externally programmable, allowing programmers other than the manufacturer of such hardware to provide their own algorithms for the computation of color and depth information for each pixel. Because the processing of color and depth information, and other per-pixel information, maps well to a Single Instruction, Multiple Data ("SIMD") architecture, graphics hardware manufacturers have exploited parallelism to achieve high performance. Externally programmable graphics hardware, therefore, enables programmers to improve LOD management by taking advantage of both the advances made by graphics hardware manufacturers and the parallel architecture of graphics hardware generally, and the GPU in particular.

Programmable graphics hardware generally exposes both vertex processing and pixel processing, enabling programmers to substitute custom routines for either or both of these processing steps. Sufficiently advanced graphics hardware can accept the specification of a tetrahedron directly, through the specification of a line and two neighbor points, or a triangle and one neighbor point. In such a case, custom programmed vertex processing may be performed by the GPU itself, saving the transmission of data between the GPU and the central processing unit (CPU) of the host computing device. Alternatively, custom programmed vertex processing may be performed by the CPU, transforming the tetrahedra into appropriate triangles by specifying vertices and additional vertex attribute data. When performed by the CPU, the custom programmed vertex processing includes the computation of a symmetric tensor and the assignment of the unique elements of the computed symmetric tensor as vertex attribute data.

The output of the vertex processing, whether performed by the GPU or CPU can be interpolated in a known manner by the graphics hardware, taking advantage of the graphics hardware's particular ability to perform such interpolation quickly. Custom programmed pixel processing can subsequently use the interpolated vertex attribute data to reconstruct, at each pixel, the symmetric tensor which, together with the pixel coordinates and the limits, along the z-axis, of the bounding tetrahedron at that pixel, enable the determination of the Bézier coefficients of the polynomial that defines the surface to be generated. Utilizing the Bézier coefficients, it can be efficiently determined if any roots of the polynomial lie within the region of the z-axis enclosed within the bounding tetrahedron. If no such roots exist, the custom programmed pixel processing can exit early. Conversely, if the roots of the polynomial are within the relevant region, the smallest root can be used as the basis for computing a normal to a point on the surface being rendered, enabling the determination of the color and depth of that pixel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
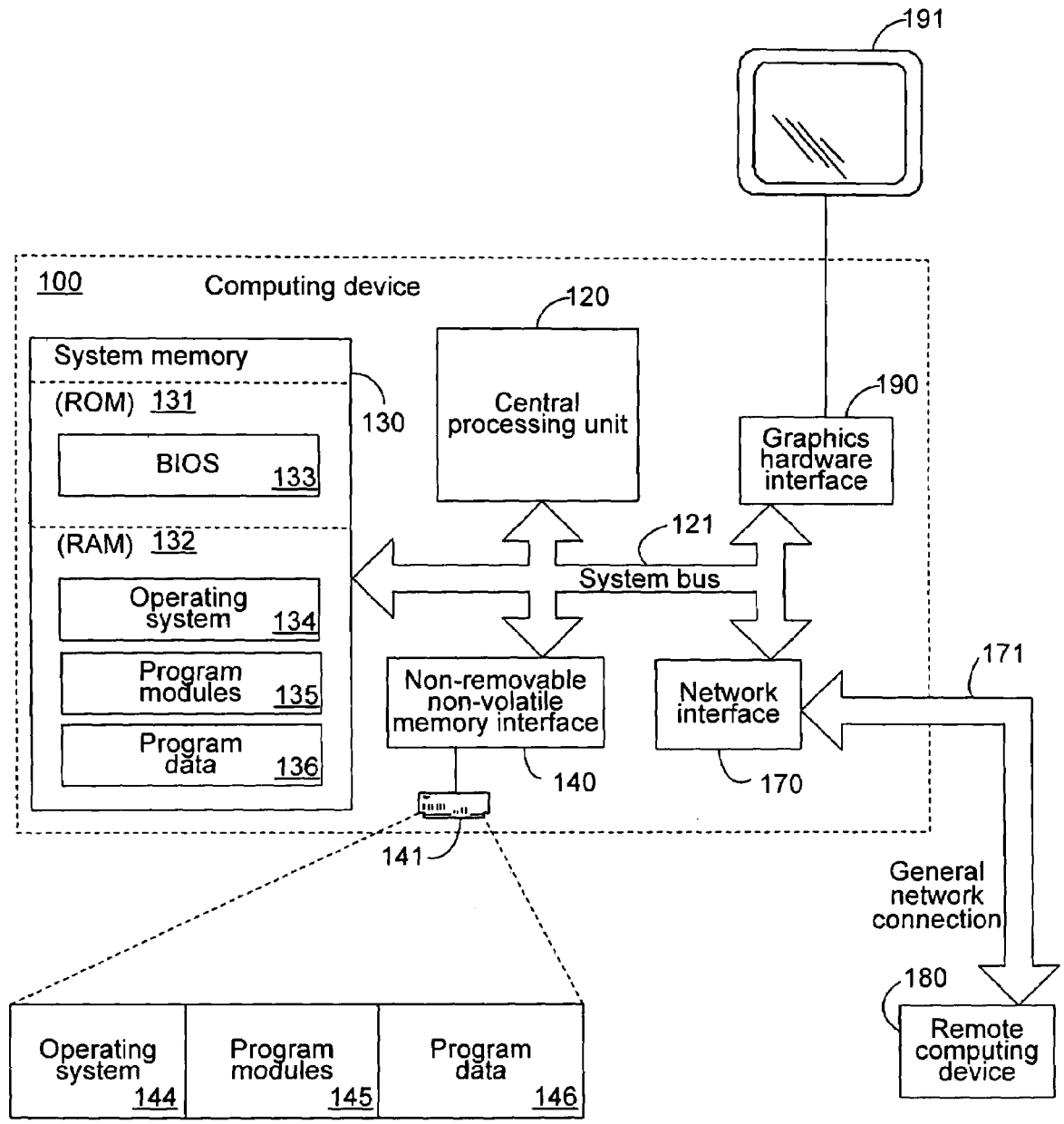
FIG. 1 is a block diagram of a host computing device.

The following description relates to the rendering of surfaces directly in terms of their polynomial representations. By rendering surfaces directly, as opposed to with an approximating triangle mesh, the techniques described herein avoid tessellation artifacts and the need for LOD management. To perform such direct rendering, the computational strengths of the graphics hardware are leveraged by associating, as vertex attributes, the unique elements of a symmetric tensor that represents the coefficients of the polynomial that defines the surface to be rendered within a volume of space. Additionally, because the polynomial coefficients of each surface element are resolution-independent, as opposed to the more conventionally used triangle mesh, which is resolution-dependent, the memory and bandwidth requirements are reduced.

The techniques described herein are focused on rendering of shapes described by polynomials of any order, though polynomials up to fourth order can utilize straightforward mechanisms to identify the zeros of the polynomial, while higher order polynomials can require more computationally expensive mechanisms to identify the zeros of the polynomial. These shapes are considered within bounding Bézier tetrahedra and are rendered on a piecewise fashion, per each tetrahedron. The rendering techniques are able to model piecewise smooth surfaces by taking advantage of this restriction to a bounded tetrahedron combined with continuity conditions between adjacent tetrahedra.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing device need not be limited to conventional personal computers, and includes other computing configurations, including hand-held devices, multi-processor systems, microprocessor based or programmable consumer electronics, network PCs, minicomputers, mainframe computers, and the like. Similarly, the computing device need not be limited to a single computing device as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated. The computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus.

Of relevance to the descriptions below, the computing device 100 also includes graphics hardware, including, but not limited to, a graphics hardware interface 190 and a display device 191. The graphics hardware interface 190 can be compatible with the system bus 121 for communication with the central processing unit 120, system memory 130, or any other component or peripheral of the computing device 100. In addition, the graphics hardware interface 190 can comply with one or more display interfaces for connection to the display device 191. Traditionally, the graphics hardware interface 190 is a graphics card installed within the computing device 100, though it can also be a graphics chipset, an external graphics adapter or any other type of interface. The display device 191 can be any type of display device compatible with the graphics hardware interface 190, including, but not limited to, a monitor, such as a cathode ray tube (CRT) monitor or a liquid crystal display (LCD) monitor, a projector, eyewear, such as virtual monitor eyewear or three dimensional imaging eyewear, or any other graphics display hardware. The structure and operation of the graphics hardware interface 190 will be further described below with reference to FIG. 2.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 1355 and program data 136. Operating system 144, other program modules 145 and program data 146 are given different numbers hereto illustrate that, at a minimum, they are different copies.

The computing device 100 may operate in a networked environment using logical connections to one or more remote computers, such as a remote computing device 180. The remote computing device 180 may be a personal computer, a server, a router, a network PC, a peer device or other common network node, and typically includes many or all of the elements described above relative to the computing device 100. The logical connection depicted in FIG. 1 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of the remote computing device 180. It will be appreciated that the network connections shown are exemplary and other means of establishing a communications link between the computers may be used.

Figure 2:
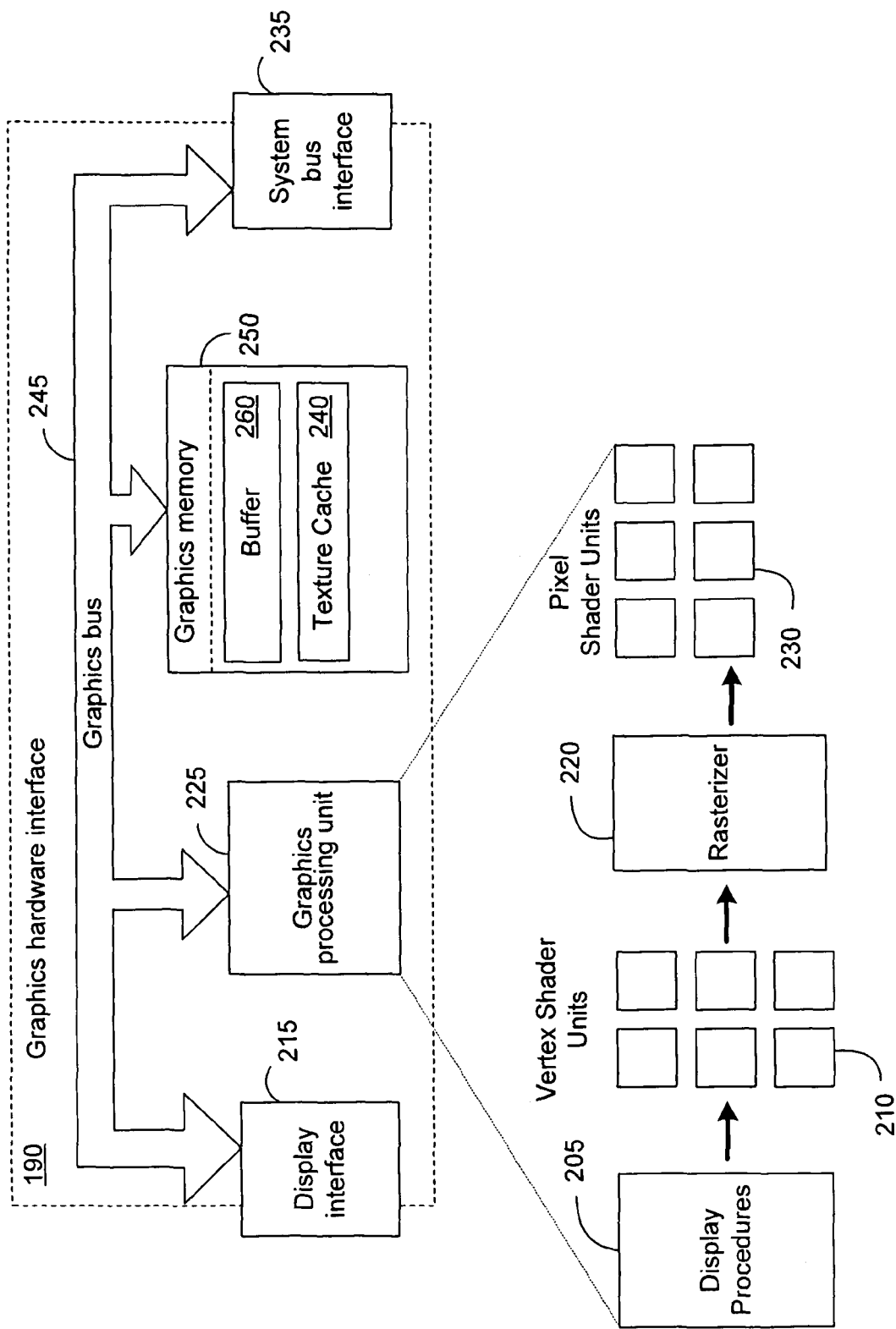
FIG. 2 is a block diagram of a graphics hardware interface, including block diagram of a graphics processing unit architecture.

Turning to FIG. 2, a simplified overview of the architecture of an exemplary graphics hardware interface is shown. In one implementation, the graphics hardware interface of FIG. 2 corresponds to the graphics hardware interface 190 of FIG. 1 and is labeled as such in FIG. 2. The graphics hardware interface 190 comprises one or more graphics processing units (GPUs) 225, a graphics memory 250, a display interface 215 and a system bus interface 235. Both the display interface 215 and the system bus interface 235 are illustrated as partially extending beyond the physical boundary of the graphics hardware interface 190 to signify the existence of physical connections by which the display interface can be communicatively coupled to the display 191 and by which the system bus interface can be communicatively coupled to the system bus 121. The display interface 215 can be any interface compatible with the display device connected to the graphics hardware interface, including, but not limited to, an S-video interface, a Video Graphics Array (VGA) interface, a Digital Visual Interface (DVI) interface or a High-Definition Multimedia Interface (HDMI) interface. The system bus interface 235 can be any interface compatible with the system bus 121 of the computing device 100 in FIG. 1 or any other interface by which instructions and data can be exchanged between the computing device 100 and the graphics hardware interface 190. Thus, in one implementation, the system bus interface 235 can be compatible with any of the types of system buses enumerated above. In an alternative implementation, the system bus interface 235 can be a Universal Serial Bus (USB) interface, an IEEE 1394 ("Firewire") interface, a Small Computer Systems Interface (SCSI) interface, a serial or parallel interface, or any other interface used by a computing device to communicate with a peripheral.

The graphics memory 250 can comprise some of the programmatic routines, instructions and objects used by the graphics processing unit (GPU) 225. The graphics memory 250 can also comprise a buffer 260 for use in rendering three dimensional representations in a manner described further below, and can comprise a texture cache 240. The GPU 225 can utilize the graphics memory 250 to perform the appropriate processing of image data; the processing generally being componentized as illustrated in FIG. 2.

Initially, display procedures 205, which describe an image to be rendered, are input into vertex shader units 210, which generate representations of the image within the context of series of vertices of triangles comprising a triangle mesh that approximates the image to be rendered. The vertex shader units can utilize parallel computing techniques to more efficiently represent the image within the triangular mesh framework, as much of the computation involved can be performed in parallel. The vertex data is then input into a rasterizer, which interpolates the data between the vertices to develop a sample set of points in image space, which can then be shaded and have texture added to them. These points are then passed to a series of pixel shader units 230 which perform shading of the points, as well as adding and manipulating textures. Like the vertex shader units 210, the pixel shader units 230 can utilize parallel computing techniques to more efficiently perform the shading and texture manipulation, since much of the computation involved can be performed in parallel. Pixel shader unit computation is frequently performed under the control of pixel shader programs, which are GPU-executable programs written to take advantage of the pixel shader units.

Textures, which can be pre-loaded into graphics memory 250, are cached in the texture cache 240. In various implementations, textures can map directly to illustrated shapes, or can alternatively be used as canonical texture spaces, which are not necessarily directly tied to an image space. Once processing is complete, the image points can then be placed in a buffer 260, such as a frame buffer, which holds color values, or a z-buffer, which holds pixel depth values along the z-axis (which, as used herein, corresponds to the viewing direction). These buffers allow for resolution of hidden surfaces by enabling the determination of which surfaces are in front and which are behind. Thus, when colors are computed by the pixel shader units, along with a depth along the z-axis for that color, the newly-computed depth can be compared to a corresponding value in the z-buffer. Then, if the depth value is less than that in the z-buffer, the newly-computed color is stored in the proper frame buffer location. However, if the depth value is greater than that in the z-buffer, the newly-computed color is behind the color value already in the buffer, and it is, therefore, ignored. In an alternative implementation (not illustrated), the image points can be written to a buffer which is kept in the graphics memory in order to increase pixel-writing speed.

Programmable graphics hardware enables third-party programmers to substitute their own code and routines for the default vertex shader units 210 and the default pixel shader units 230. Sufficiently advanced graphics hardware interfaces can accept display procedures 205 that specify an image to be rendered within the context of a collection of three-dimensional tetrahedra. In such a case, the procedures described below can be performed by the vertex shader units 210 as executed by the GPU 225. In an alternative embodiment, where the graphics hardware interface accepts display procedures 205 that specify an image to be rendered within the context of a collection of two-dimensional triangles, the procedures described below can be performed by vertex shader units as executed by the CPU 120 of the computing device 100. In such a case, the output of the vertex shader units can be passed to the graphics hardware interface 190, and thereby to the rasterizer 220, via the system bus 121 and the system bus interface 235.

Figure 3:
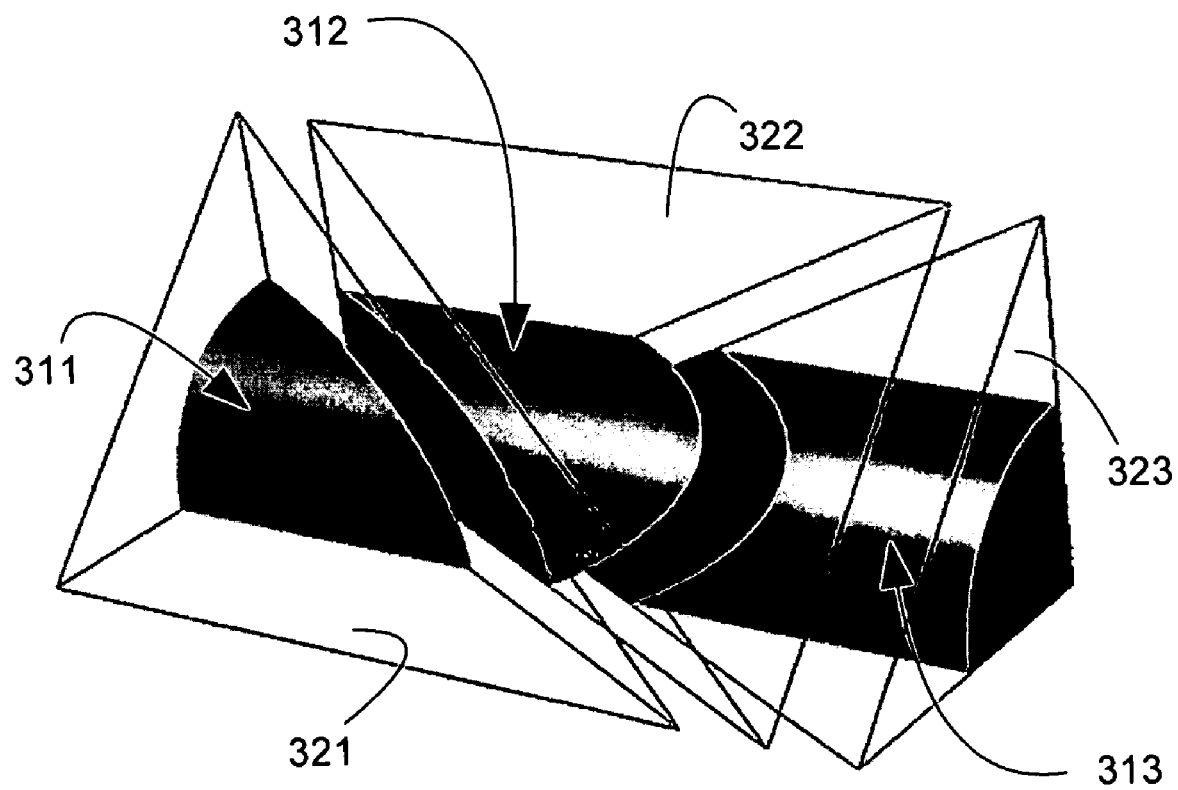
FIG. 3 is an example of dividing a surface into surface segments contained within bounding tetrahedra.

Complex three-dimensional surfaces can be represented as a piecewise smooth collection of mathematically simpler surfaces within small contiguous regions. Turning to FIG. 3, an illustrative example of such a process is shown with reference to the surface 310. For illustration purposes, surface 310 is a simple surface, though any surface can be divided in the manner shown. The shading is intended to convey that surface 310 is a three dimensional surface.

Also illustrated are three tetrahedra 321, 322 and 323 that represent a small volume of space, a quantum of space, within which the surface 310 may be described in a mathematically simpler fashion. Thus, as shown, tetrahedra 321, 322 and 323 divide surface 310 into subsections 311, 312 and 313, respectively, each of which is bounded by the edges of a tetrahedron. The divided subsections do not need to be similarly shaped or sized.

Because the tetrahedra share common sides, and because the bounded surfaces can be defined to represent a contiguous surface over the tetrahedral boundaries, the entire surface appears whole when the three bounded surfaces are rendered together. Thus, for graphical display purposes, the rendering of subsections 311, 313 and 313 will result in the rendering of the surface 310. When rendering a shape as the composition of a plurality of tetrahedra, the shape may be divided after definition according to a partitioning method, or the shape may be defined at the outset as a plurality of different mathematically defined shapes, each bound in a tetrahedron, that are situated so as to appear to be a contiguous whole upon rendering.

The rendering techniques described herein take advantage of tetrahedra partitioning by representing surfaces in Bézier tetrahedral form. A Bézier tetrahedral form of a surface is defined within a bounding tetrahedron. For example, if T is a tetrahedron with four vertices $v_i = [x_i, y_i, z_i, 1]$ (for i=0, 1, 2, 3), T can be encoded in a matrix $$T = \begin{bmatrix} x_0 & y_0 & z_0 & 1 \\ x_1 & y_1 & z_1 & 1 \\ x_2 & y_2 & z_2 & 1 \\ x_3 & y_3 & z_3 & 1 \end{bmatrix}.$$

Given such a T, an algebraic surface of degree d can be defined by T as:

$$\sum_{i+j+k+l=d} b_{ijkl} \binom{d}{ijkl} r^i s^j t^k u^l = 0, \tag{1}$$

where $b_{i\ j\ k\ l}$ are scalar-valued Bézier coefficients, or "weights," that control the shape of the surface and r, s, t and u are barycentric coordinates of a point in space with respect to the tetrahedron T, defined above. The tetrahedron T is generally called a "world space domain tetrahedron." As will be known by those skilled in the arts, barycentric coordinates sum to 1. In other words, r, s, t and u are barycentric coordinates in that r+s+t+u=1.

When r, s, t and u are all positive and satisfy Equation (1), the surface to be rendered is inside the tetrahedron defined by T. Furthermore, each weight $b_{ijkl}$ is associated with a position in space, given by $$\frac{(iv_0 + jv_1 + kv_2 + lv_3)}{d}.$$

These positions form a tetrahedral array.

Figure 4:
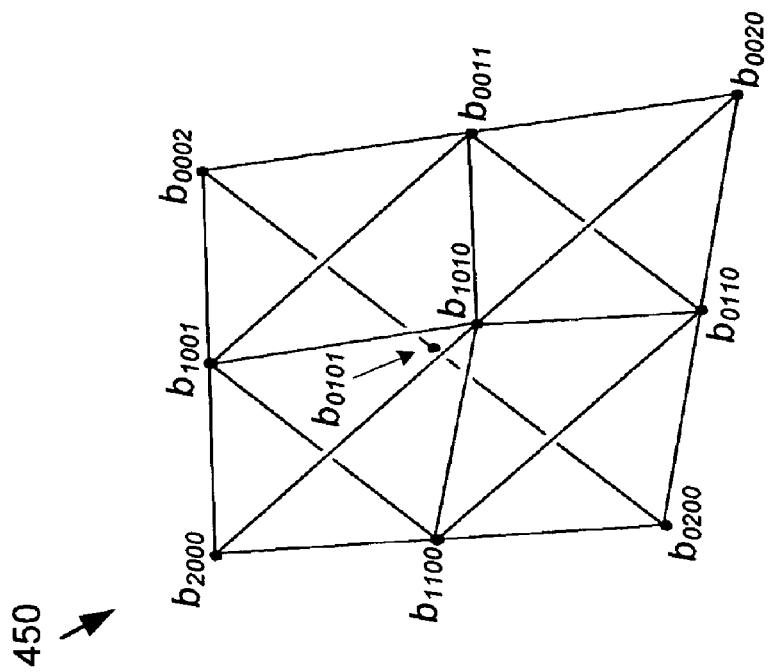
FIG. 4 is an example of a surface in a tetrahedron and a representation of the surface as a set of Bézier weights in the tetrahedron.
Figure 4:
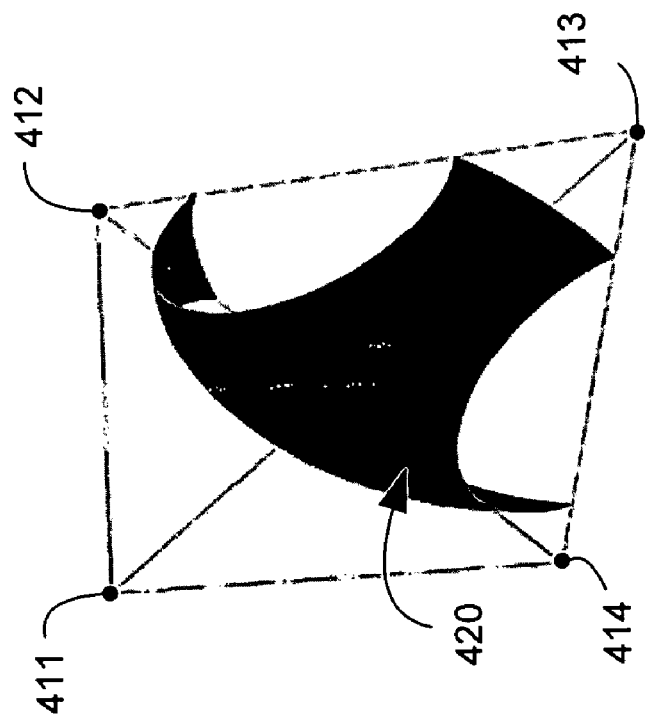

Turning to FIG. 4, an exemplary tetrahedral array 450 is illustrated. As can be seen, tetrahedral array 450 comprises weights $b_{i\ j\ k\ l}$ where i, j, k and l vary from 0 to 2. Positive weights act as an attractive force to the position, in the tetrahedral array, of the weight and negative weights act as a repellent force from the position of the weight. Also illustrated in FIG. 4 is a bounding tetrahedron defined by vertices 411, 412, 413 and 414 that corresponds to the tetrahedral array 450. Specifically, the tetrahedron defined by vertices 411, 412, 413 and 414 contains, and limits, a surface 420, which can mathematically be expressed within the bounding tetrahedron by Equation (1). Tetrahedral array 450 is, therefore, identical in size and shape to the bounding tetrahedron defined by vertices 411, 412, 413 and 414, but shows the Bézier weights which define the shape 420.

The advantage of using a Bézier tetrahedral form for shape rendering is that solutions where r,s,t,u ∈ [0,1] are guaranteed to lie within the convex hull of the tetrahedron T. This restriction to a tetrahedron has several benefits. For example, it has been shown that it is possible to state simple explicit continuity conditions between the weights of a pair of adjacent tetrahedra such that the composite surface is continuous or smooth. Dealing with tetrahedral elements in a graphics system also enables view frustum culling, as well as extent and interference testing.

Each Bézier tetrahedron has a "blossom," or "polar form," that is a symmetric multi-affine map unique to that Bézier tetrahedron. As will be known by those skilled in the art, mathematically, a second order algebraic surface is given by the equation:
Q(x,y,z,1)=0, where the variables x, y and z are not raised to a power higher than 2. The polynomial Q can also be expressed as $Q(x,y,z,1) = xQx^T = 0$, where x=[x y z 1] is a point represented in homogenous form, and $$Q = \begin{bmatrix} q_{2000} & q_{1100} & q_{1010} & q_{1001} \\ q_{1100} & q_{0200} & q_{0110} & q_{0101} \\ q_{1010} & q_{0110} & q_{0020} & q_{0011} \\ q_{1001} & q_{0101} & q_{0011} & q_{0002} \end{bmatrix}$$

is a symmetric matrix. This is known as the "blossom," or "polar form," of the polynomial Q. For Bézier tetrahedra greater than second order, a blossom can be evaluated using a symmetric tensor. As will be understood by those skilled in the art, a tensor is a higher dimensional analog of a matrix, where the number of indices indicates the "rank" of the tensor. One advantage of using tensor notation is that blossoms can be evaluated in terms of dot products, which are native operations on many GPUs.

Tensor algebra generalizes the notion of dot product and matrix multiplication to "tensor contraction," which can be represented using Einstein index notation where contravariant indices are indicated as superscripts and covariant indices as subscripts. An expression that has the same symbol, typically a Greek letter, in a superscript and a subscript indicates that an implied summation is performed over that index.

Thus, in tensor notation, Equation (1) can be represented as d contractions $$r^{\alpha_1} \ldots r^{\alpha_d} B_{\alpha_1 \ldots \alpha_d} = 0, \quad (2)$$

where B is a symmetric rank d tensor containing the Bézier weights, and r=[r s t u]. The elements of the tensor B are assigned Bézier weights by $B_{\alpha_1 \ldots \alpha_d} = b_{e_{\alpha_1} + \ldots + e_{\alpha_1}}$, where $e_{60}$ is a 4-tuple with a 1 at position α and zeros elsewhere.

Figure 5:
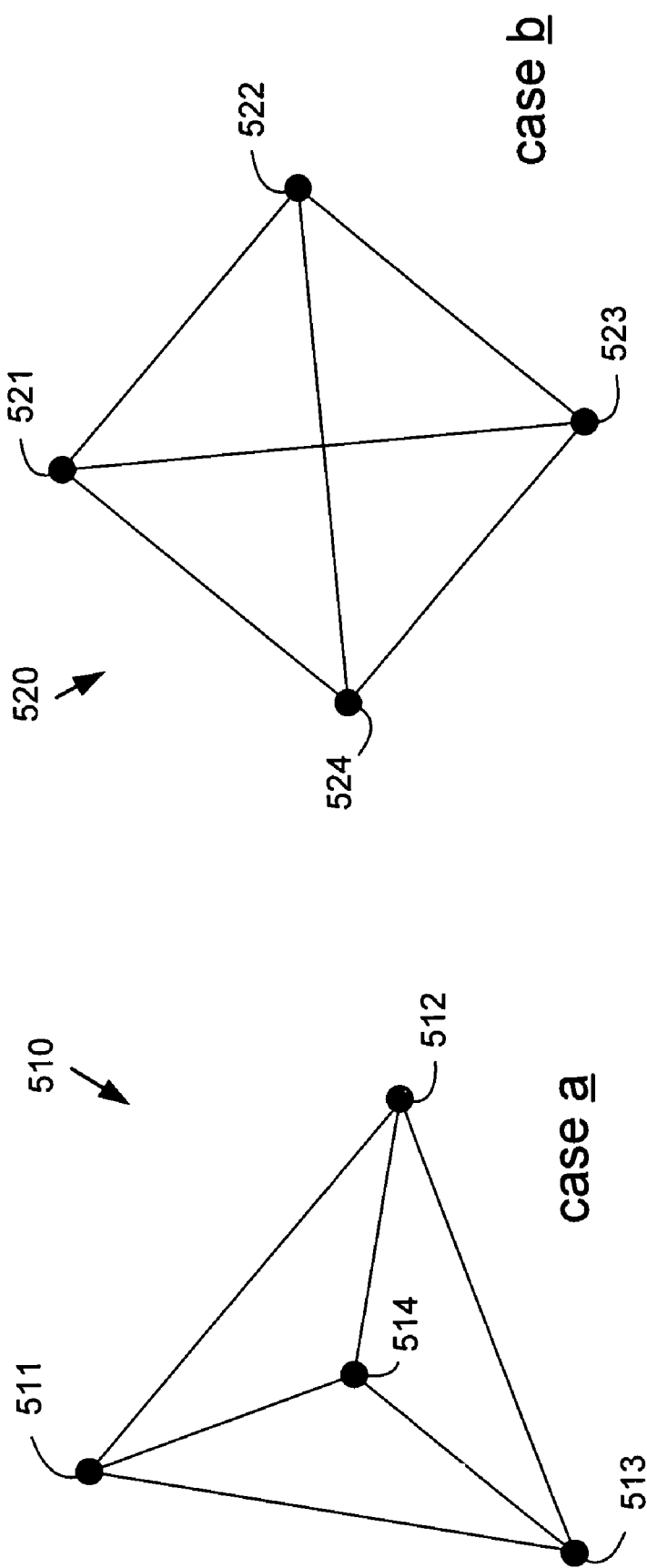
FIG. 5 is the screen space projection of a tetrahedron.

To generate a three-dimensional surface using a display device that displays two-dimensional images, the three-dimensional surface is projected onto a two-dimensional plane. As indicated previously, the surface to be generated is divided into segments bounded by tetrahedra. Thus, a tetrahedron projected onto a two-dimensional plane can act as a basis for determining how to display the three-dimensional surface. Turning to FIG. 5, two cases for projecting a tetrahedron onto a plane are illustrated. The projection 510 is nominated case "a" for more efficient reference, and the projection 520 is nominated case "b". Projection 510 represents a tetrahedron oriented such that the triangle formed by vertices 511, 512 and 513 is furthest from the reader and the vertex 514 is closest to the reader, or vice-versa. More colloquially, the tetrahedron represented by projection 510 can be visualized as either the top or bottom view of a three-sided pyramid. Projection 520 represents a tetrahedron where the edge between vertices 521 and 523 is furthest from the reader and the edge between vertices 522 and 524 is closest to the reader, or vice-versa.

The plane onto which the tetrahedron is projected is termed "screen space" and the pixel coordinates of the pixels of the screen are represented as an ordered pair of x and y in a conventional manner. Screen space can be thought of as a four dimensional projective space where $[x \ y] \in [-1,1] \times [-1,1]$ and depth z correspond to the value of the fourth dimensional axis, w, being equal to 1.

By the definition of barycentric coordinates, a point "x" in world space, represented by the vector x, can be expressed as: $x = r \cdot T$. The composite transform from barycentric coordinates to screen space, where the point x in screen space is represented by the vector $\tilde{x}$, can be expressed as: $\tilde{x} = r(T \cdot M)$. Consequently, the barycentric coordinates of a screen space point are: $r = \tilde{x} \cdot (M^{-1} \cdot T^{-1}) = \tilde{x} \cdot W$.

Given the above, the tensor weights of tensor B can be transformed to screen space, yielding a tensor $\tilde{B}$, as follows: $\tilde{B}_{\beta_1 \ldots \beta_d} = W_{\beta_1}{}^{\alpha_1} \ldots W_{\beta_d}{}^{\alpha_d} B_{\alpha_1 \ldots \alpha_d}$. As a result, Equation (2) can be rewritten in screen space as:

$$\tilde{x}^{\beta_1} \ldots \tilde{x}^{\beta_d} \tilde{B}_{\beta_1 \ldots \beta_d} = 0 \quad (3)$$

By transforming the bounding tetrahedron vertex matrix T and the weight tensor B into screen space, the viewing rays, for purposes of generating the three-dimensional surface on the display device, become parallel to the z axis. An alternative embodiment contemplates transforming the viewing rays into the barycentric coordinate system of each Bézier tetrahedron. In such a case a univariate equation in the space of the barycentric coordinate system of each Bézier tetrahedron would be solved to generate the three-dimensional surface on the display device.

Returning to FIG. 5, the projections 510 and 520 can be considered to be projections of the bounding tetrahedron, given by the vertex matrix T, onto screen space. As such, the projections 510 and 520 can be given by a vertex matrix nominated $\tilde{T}$, following the above notation. The vertex matrix $\tilde{T}$ can describe either case a or case b, illustrated by projections 510 and 520, respectively. If the inverse matrix, $\tilde{T}^{-1}$, whose columns represent the four planes containing the faces of the tetrahedral projection, has 1 or 3 negative z values among those planes, then the vertex matrix $\tilde{T}$ describes case a. If the inverse matrix $\tilde{T}^{-1}$ has 2 negative z values among those planes, then the vertex matrix $\tilde{T}$ describes case b.

Figure 6:
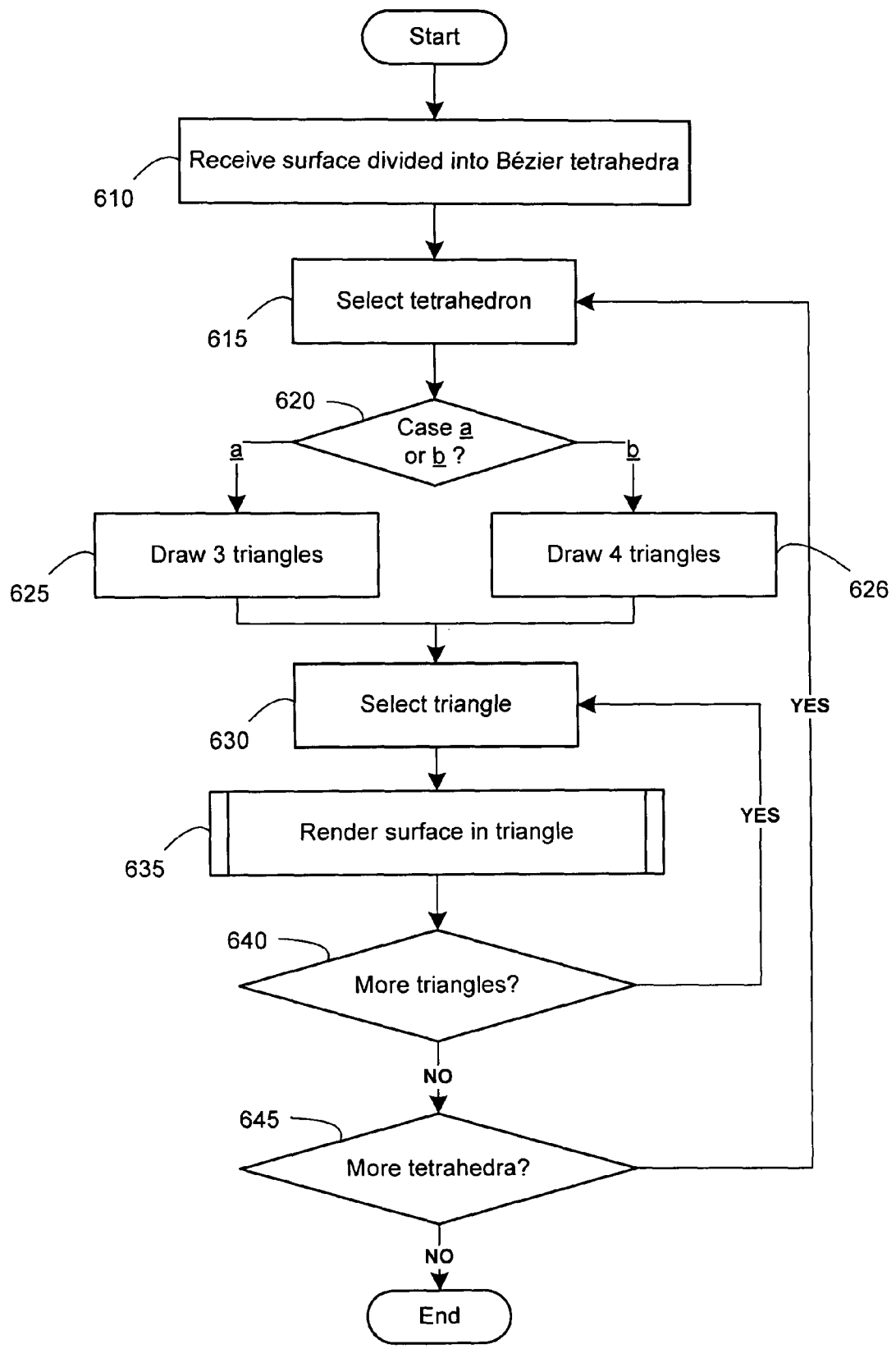
FIG. 6 is a flowchart illustrating an exemplary process for generating a three-dimensional surface on a two-dimensional display.

Turning to FIG. 6, the overall mechanisms by which a three-dimensional surface can be generated on a two-dimensional display are illustrated. In various implementations, blocks of process illustrated in FIG. 6 may be combined, subdivided, or rearranged. In one implementation, the process illustrated by FIG. 6 may be performed by dividing tasks between a CPU and a GPU. In alternative implementations, a GPU may perform all tasks, or GPU functions may be emulated by a CPU. Initially, the surface to be generated is divided into Bézier tetrahedra in an analogous fashion to that illustrated in FIG. 3. In one implementation, the process takes a complex shape and divides the surface into the set of tetrahedra. Another implementation contemplates that the surface is already divided, and yet another implementation contemplates that only a single surface is rendered.

The divided surface is received at step 610 and at step 615, a tetrahedron is selected for generating the subsection of the surface contained within that tetrahedron. In one implementation, the first tetrahedron may be chosen to be one that is further away from the eye point of a viewer than other tetrahedra. In another implementation, the tetrahedron may be chosen randomly or by other criteria.

Step 620 determines whether the selected tetrahedron is case a or case b, as illustrated in FIG. 5. In one embodiment, step 620 is implemented by counting the number of negative z values in the columns of the matrix $\tilde{T}^{-1}$ in the manner indicated above. If it is determined, at step 620, that the tetrahedron selected at step 615 is projected onto screen space as in case a, then three triangles are drawn at step 625. Turning back to FIG. 5, projection 510 illustrates the three triangles, with one triangle being defined by vertices 511, 512 and 514, another triangle being defined by vertices 511, 514 and 513, and the third triangle being defined by vertices 514, 513 and 512. However, if step 620 determines that the tetrahedron selected at step 615 is projected onto screen space as in case b, then four triangles are drawn at step 626. Again, turning back to FIG. 5, projection 520 illustrates the four triangles, with one triangle being defined by vertices 521, 522 and 524, another being defined by vertices 522, 524 and 523, yet another being defined by vertices 521, 523 and 524, and the fourth triangle being defined by vertices 521, 522 and 523.

Turning back to FIG. 6, once the triangles dividing up the projection of the selected tetrahedron are drawn, one of those triangles is selected at step 630. In one implementation, the triangle may be chosen because it is visible to a viewer, thereby reducing superfluous computation of non-viewable portions of the surface. In alternative implementations, however, non-visible triangles may be rendered, and other criteria may be used when choosing the first triangle.

The surface contained within the selected triangle is rendered at step 635, in a manner that will be described in more detail below with reference to FIG. 7. Once the surface has been rendered, step 640 performs a check to ensure that all of the triangles of the projected tetrahedron have been processed. Thus, in case a, step 640 can loop back to step 630 two times, while in case b, step 640 can loop back to step 630 three times. If step 640 does not loop back, then the processing related to the tetrahedron selected at step 615 has been completed, and step 645 can check whether additional tetrahedra remain. If additional tetrahedra remain, then step 645 can loop back to step 615. If no additional tetrahedra remain, then the surface has been generated, and the procedure can end.

Turning back to step 635, in order to generate, within the selected triangle, the two-dimensional representation in screen space of a three-dimensional surface, the screen space pixels contained within the triangle are evaluated. For any pixel within the triangle, given by its standard [x y] position, the surface to be generated exists at that pixel when the vector $\tilde{x}=[x\ y\ z1]$ satisfies Equation (3), given above. To determine the z-axis boundaries of the tetrahedron, being projected onto the pixel at [x y], the minimum and maximum z values can be determined at the vertices and then interpolated across the projected tetrahedron.

Turning back to FIG. 5, for each vertex illustrated, a minimum and maximum z values at that vertex can be determined. For example, as previously described, projection 510 can be colloquially thought of as a top or bottom view of a three-sided pyramid. In other words, the base of the pyramid can be colloquially thought of as existing on a piece of paper on which projection 510 is printed, and the top of the pyramid can be colloquially thought of as being either above the piece of paper or below it, such that, when projected onto the paper, projection 510 is formed. Thus, for vertices 511, 512 and 513, the minimum z value will be equivalent to the maximum z value since, at those points, a line perpendicular to the printed paper would only intersect the tetrahedron in one place, namely on the paper itself. However, for vertex 514, the minimum and maximum z values will be different since a line perpendicular to the paper would intersect the tetrahedron at two different heights: once at the "tip" of the pyramid and again at its base. Once the $z_{min}$ and $z_{max}$ values for the vertices are determined, the $z_{min}$ and $z_{max}$ values for any pixel within the projection of the bounding tetrahedron can be determined by interpolating the vertex values across the projection. In one implementation, this interpolation is performed by the rasterizer 220 at step 710, in the manner described in further detail below.

For a particular pixel, having specific x and y values and a range of z values between the $z_{min}$ and $z_{max}$ for that pixel, the determination of whether vector $\tilde{x}=[x\ y\ z\ 1]$ satisfies Equation (3) becomes a determination of the roots of a degree d polynomial in z. To simplify the root-finding, the univariate polynomial can be expressed in Bézier form:

$$\sum_{i=0}^{d} \binom{d}{i}(1-v)^{d-i}v^i a_i = 0. \quad (4)$$

To correspond Equation (4) with Equation (3), given above, vectors p and q can be defined such that, for a pixel having a position [x y] and a pixel-specific $z_{min}$ and $z_{max}$, $$p=[x\ y\ z_{min}\ 1] \text{ and } q=[x\ y\ z_{max}\ 1]. \quad (5)$$

Consequently, a point in screen space, represented by the vector $\tilde{x}$, can be expressed as $\tilde{x}=(1-v)p+vq$. Plugging this equation into Equation (3), from above, the coefficients $a_i$ of Equation (4) can be written as:

$$a_0 = p^{\beta_1} \cdots p^{\beta_d} \tilde{B}_{\beta_1 \cdots \beta_d}, \quad (6)$$
$$\vdots$$
$$a_i = q^{\beta_1} \cdots q^{\beta_i} p^{\beta_{i+1}} \cdots p^{\beta_d} \tilde{B}_{\beta_1 \cdots \beta_d},$$
$$\vdots$$
$$a_d = q^{\beta_1} \cdots q^{\beta_d} \tilde{B}_{\beta_1 \cdots \beta_d}.$$

Each of these coefficients, with the exception of $a_d$, have a common factor of $p^{\beta_d}\tilde{B}_{\beta_1 \ldots \beta_d}$, which is just $p \cdot \tilde{B}$, a symmetric tensor of rank d−1 with $$\binom{d+2}{d-1}$$

unique elements. Stated mathematically:

$$p^{\beta_d}\tilde{B}_{\beta_1 \ldots \beta_d} = p \cdot \tilde{B}. \quad (7)$$

Figure 7:
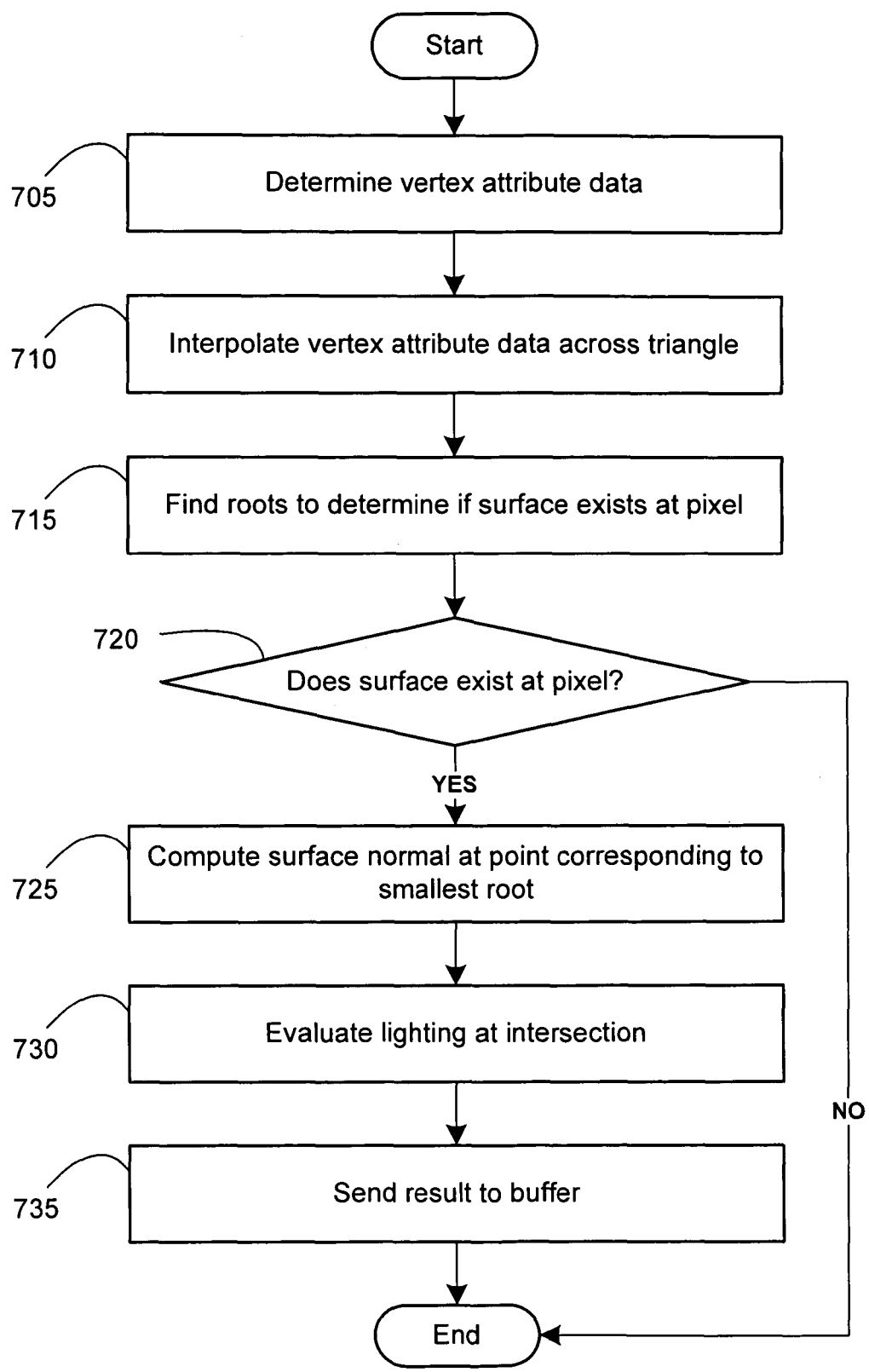
FIG. 7 is a flowchart illustrating an exemplary process for generating a portion of the surface.

Turning to FIG. 7, the rendering procedure of step 635 of FIG. 6 is illustrated in greater detail. As with FIG. 6, in various implementations, blocks of the process illustrated in FIG. 7 may be combined, subdivided, or rearranged. In one implementation, the process may be performed by dividing tasks between a CPU and a GPU. In alternative implementations, a GPU may perform all tasks, or GPU functions may be emulated by a CPU. As an example of these multiple implementations, the determination, at step 705, of the vertex attribute data can be performed by the CPU in one implementation and by the GPU in another implementation. When performed by the GPU, the determination of vertex attribute data will be based on the four vertices of a tetrahedron passed to the GPU either as a triangle and one neighbor point, or as a line and two neighbor points. When performed by the CPU, the determination of vertex attribute data will result in the passing of such data, in the form of three vertices defining a triangle, from the CPU to the rasterizer 220 of the graphics hardware interface 190 to perform the interpolation of step 710.

The vertices considered by step 705 are the vertices of the screen space triangle selected by step 630, and each vertex can be represented as $w_j=[x_j\ y_j\ z_{minj}\ 1]$. A vector p can be represented in the form $p=rw_0+sw_1+tw_2$, and, consequently, by the linearity of dot products $p\cdot\tilde{B}=r(w_0\cdot\tilde{B})+s(w_1\cdot\tilde{B})+t(w_2\cdot\tilde{B})$. The partially collapsed rank d−1 tensor $p\cdot\tilde{B}$, which is the common factor in each of the coefficients (with the exception of $\alpha_d$) listed by Equation (6), can, therefore, be determined at each pixel by evaluating $w_j\cdot\tilde{B}$ at the vertices of the triangle and then interpolating across the triangle. Because the rasterizer 220 can be very efficient at interpolating, the $$\binom{d+2}{d-1}$$

unique elements of the symmetric tensor $w_j\cdot\tilde{B}$ can be associated with the relevant vertex (represented by the variable j) by being stored as vertex attribute data.

Other data which is to be interpolated across the triangle can likewise be stored as vertex attribute data. For example, as indicated previously, the maximum and minimum z values, $z_{min}$ and $z_{max}$, for the vertices are also stored as vertex attributed data so that the $z_{min}$ and $z_{max}$ values for any pixel can be obtained from the interpolation.

Once the vertex attribute data has been determined, such as in the manner described above, either by the CPU 120 or the GPU 225, it can be provided to the rasterizer 220 for interpolation across the triangle, as indicated by step 710. In interpolating the vertex attribute data, the rasterizer will, in a manner known to those skilled in the art, take into account the number of pixels, or other display quanta, relevant to the triangle and output interpolated attribute data for each pixel. The rasterizer will also, again in a manner known to those skilled in the art, interpolate the attribute data in a non-linear fashion to account for any transformations based on the point from which the surface to be rendered is being viewed. Such viewpoint transformations are common in the computer graphics arts and rasterizers are generally configured to interpolate in a "perspectively correct" manner to account for viewpoint transformations. The per-pixel data output by the rasterizer can then be used by the pixel shader 230 to determine the color and z-value of the relevant pixel.

Initially, the symmetric tensor $p \cdot \tilde{B}$ is reconstructed at each pixel by using the interpolated data and the points represented by the vectors p and q, as given by Equation (5). Subsequently, pixel coordinates x and y can be determined by reverse mapping the contents of a hardware register through the viewpoint transform that was used to change the point in space from which the surface being rendered is being viewed. Additionally, the maximum and minimum z values can be obtained from the interpolated data, as indicated above. The $a_0, \ldots, a_{d-1}$ coefficients of Equation (4) can then, be computed as given by Equation (6). The final coefficient, $a_d$, can be determined by expressing the point given by the vector q as $q=p+\delta z$, where $\delta=(z_{max}-z_{min})$ and $z=[0\ 0\ 1\ 0]$. The coefficient $a_d$ can then be given as $a_d=(p+\delta z)^{\beta_1} \ldots (p+\delta z)^{\beta_d} \tilde{B}_{\beta_1 \ldots \beta_d}$. Expressed as a summation, the coefficient $\alpha_d$ can be given as:

$$a_d = \sum_{i=0}^{d} \binom{d}{i} \delta^i z^{\beta_1} \ldots z^{\beta_i} p^{\beta_{i+1}} \ldots p^{\beta_d} \tilde{B}_{\beta_1 \ldots \beta_d}, \quad (8)$$

which is a polynomial in $\delta$.

Because the dot product of z with a tensor essentially selects the third element of that tensor, the expression for $a_d$ simplifies to a weighted sum of elements of tensors that have already been determined while computing the coefficients $a_0, \ldots, a_{d-1}$. The one exception is the value given by $z^{\beta_1} \ldots z^{\beta_d} \tilde{B}_{\beta_1 \ldots \beta_d} = \tilde{B}_{3, \ldots, 3 \,(d\ times)}$, which is a constant that can be accounted for in the set of interpolated vertex attribute data.

Once the coefficients of the univariate polynomial expressed in Bézier form given by Equation (4) have been determined, the roots of the polynomial can be calculated to determine whether the surface to be generated is within the triangle being considered. In one implementation, step 720 can be performed prior to the completion of step 715 by merely examining the values of the Bézier coefficients of Equation (4). If all of the $a_i$ have the same sign then, according to the convex hull property, there are no roots within the range [0, 1]. Stated differently, there is no z value for the particular pixel being considered for which Equation (4) will be satisfied. Consequently, there is no component of the surface visible at the pixel being considered, and the pixel shader need not perform any further computations. Thus, as shown by FIG. 7, if step 720 determines that the surface is not visible from the pixel being considered, it can end.

If, however, all of the coefficients do not have the same sign, then step 715 can proceed to determine the roots of Equation (4). In one embodiment, the roots of Equation (4) are determined iteratively in a manner known to those skilled in the art. Iterative root finding can be useful with polynomials of degree 5 or higher. In another embodiment, the roots of Equation (4) are determined analytically. For polynomials of degree 2, 3 or 4, relatively simple solutions exist when the polynomial is express in the power basis. However, the relationship between power and Bernstein basis is given by a homogenous projective transformation in parameter space. Thus, while in the power basis, conventional polynomial root finding attempts to "depress" the polynomial by translating it in parameter space to generate a new polynomial with one coefficient being equal to 0, in Bernstein basis, the translation between an original space (nominated [x w] without reference to prior uses of those same variable names) and a depressed space $[\tilde{x}\ \tilde{w}]$ is given by a matrix product:

$$[xw] = [\tilde{x}\tilde{w}] \begin{bmatrix} 1 & 0 \\ -a_{d-1} & a_d \end{bmatrix}.$$

Given an arbitrary first row [p q], a matrix that can depress the polynomial can be expressed as:

$$[xw] = [\tilde{x}\tilde{w}] \begin{bmatrix} p & q \\ -f_w(p,q) & f_x(p,q) \end{bmatrix},$$

where the subscripts on the term "f" indicate partial derivatives. The determinant of this transformation is d times $f(p,q)$. Consequently, any [p q] that is not a root of the polynomial f can result in a transformation that is not singular. In one implementation, [0 1] can be used as [p q], generating the original translation. In another implementation, [1 0] can be used as [p q], effectively reversing the order of the coefficients and thereby solving for w/x instead of x/w, and subsequently inverting the results. In yet another implementation, [1 1] or [1 −1] can be used as [p q], performing a 45 degree rotation in parameter space. Selection among the various possibilities can be based on whichever will provide the largest value of |f (p,q)|. Additionally, to avoid singularities, at least one more [p q] selection than the number of roots of the polynomial can be used.

Subsequently, the roots of the polynomial can be determined by known techniques. The results can then by transformed back to the original [x w] space by the 2×2 transform. In one implementation, the conversion back to [v 1] space can be combined with the transformation to the original [x w] space, as that is another 2×2 transform.

Once step 715 has determined the roots of the polynomial given by Equation (4), step 720 can determine if there are any real roots, such that the surface to be generated is visible at the pixel being considered. If there are no real roots, the surface is not visible at that pixel, and the process can end as illustrated. However, if real roots exist at the pixel being considered, the surface normal can be computed at step 725.

In one implementation, the smallest root v can be used to compute a surface normal at the surface $\tilde{x}=(1-v)p+vq$ by collapsing the tensor $\tilde{B}$ down to the tangent plane using $1_{\beta_1} = \tilde{x}^{\beta_2} \ldots \tilde{x}^{\beta_d} \tilde{B}_{\beta_1 \ldots \beta_d}$. Substituting in $\tilde{x}=p+(v\delta)z$, the tangent plane becomes $1_{\beta_1} = (p+(v\delta)z)^{\beta_2} \ldots (p+(v\delta)z)^{\beta_d} \tilde{B}_{\beta_1 \ldots \beta_d}$. Expressed in summation form, the tangent plane becomes a polynomial in $(v\delta)$:

$$l_{\beta_1} = \sum_{i=0}^{d-1} \binom{d-1}{i} (v\delta)^i z^{\beta_2} \ldots z^{\beta_{i+1}} p^{\beta_{i+2}} \ldots p^{\beta_d} \tilde{B}_{\beta_1 \ldots \beta_d}. \quad (9)$$

As with Equation (8), above, the tangent plane is a weighted sum of previously computed tensors and a constant given by:

$$z^{\beta_2} \ldots z^{\beta_d} \tilde{B}_{\beta_1 \ldots \beta_d} = \tilde{B}_{\beta_1 3, \ldots, 3(d-1 \text{ times})}. \quad (10)$$

This constant can then be added to the set of interpolated vertex attributes.

Once the tangent plane, or surface normal, is determined, a lighting evaluation can be performed, as illustrated by step 730, in a manner known to those skilled in the art. Finally, at block 735, the result of the lighting calculation, which is a combination of a color and a z-value, is sent to the buffer to be physically presented via the display device 191.

In view of the many possible variations of the subject matter described herein, we claim as our invention all such embodiments as may come within the scope of the following claims and equivalents thereto.

We claim:

1. A computer-readable storage medium that does not consist of a signal, said computer-readable storage medium storing computer-executable instructions that, when executed by a computer, cause the computer to perform steps for generating a visual representation of a three-dimensional surface, the surface being described by reference to one or more polynomials bounded by one or more Bézier tetrahedra, the computer-executable instructions directed to steps comprising:
    defining a bounding Bézier tetrahedron as a set of coordinates and a symmetric weight tensor containing Bézier weights which define a shape of the surface within the bounding Bézier tetrahedron;
    projecting the bounding Bézier tetrahedron onto a planar screen space;
    dividing the projected bounding Bézier tetrahedron into triangles having three vertices;
    associating with each vertex of a triangle in the projected bounding Bézier tetrahedron a minimum and maximum height value as vertex attribute data;
    computing a partially collapsed symmetric tensor at each vertex of the triangle, the partially collapsed symmetric tensor having a lower rank than the symmetric weight tensor and representing a common factor in coefficients of a univariate polynomial bounded by the bounding Bézier tetrahedron;
    associating with each vertex of the triangle unique elements of the partially collapsed tensor as vertex attribute data to be interpolated when rasterizing the triangle;
    providing the vertices and vertex attribute data for interpolation across the triangle;
    reconstructing the partially collapsed symmetric tensor for a pixel within the triangle using the vertex attribute data;
    computing the coefficients of the univariate polynomial bounded by the bounding Bézier tetrahedron; and
    determining if the three-dimensional surface is visible at the pixel within the triangle in the projected bounding Bézier tetrahedron based on the computed coefficients of the univariate polynomial.

2. The computer-readable storage medium of claim 1 further storing computer-executable instructions directed to steps comprising:
    obtaining the symmetric weight tensor via a blossom of one of the one or more polynomials;
    transforming the symmetric weight tensor to screen space; and
    computing the partially collapsed symmetric tensor by evaluating the transformed symmetric weight tensor at the vertices of the triangle.

3. The computer-readable storage medium of claim 1 further storing computer-executable instructions directed to steps comprising:
    determining if a polynomial representing the three-dimensional surface at a specific location is equal to zero for any height value between a minimum and maximum height values at the specific location.

4. The computer-readable storage medium of claim 3 further storing computer-executable instructions for depressing the polynomial representing the three-dimensional surface at the specific location to maximize the absolute value of the depressed polynomial at the specific location.

5. The computer-readable storage medium of claim 1, wherein one or more of the steps are performed by a central processing unit of the computer.

6. The computer-readable storage medium of claim 1, wherein one or more of the steps are performed by a graphics processing unit of the computer.

7. The computer-readable storage medium of claim 1 further comprising computer-executable instructions for determining a surface normal to the three-dimensional surface to be generated, the surface normal being at a smallest root location.

8. A graphics system for generating a visual representation of a three-dimensional surface, the surface being described by reference to one or more polynomials bounded by one or more Bézier tetrahedra having vertices, the graphics system comprising:
    a vertex processor configured to:
        defining a bounding Bézier tetrahedron as a set of coordinates and a symmetric weight tensor containing Bézier weights which define a shape of the surface within the bounding Bézier tetrahedron,
        project the bounding Bézier tetrahedron onto a planar screen space,
        divide the projected bounding Bézier tetrahedron into triangles having three vertices,
        associate with each vertex of a triangle in the projected bounding Bézier tetrahedron a minimum and maximum height value as vertex attribute data,
        compute a partially collapsed symmetric tensor at each vertex of the triangle, the partially collapsed symmetric tensor having a lower rank than the symmetric weight tensor and representing a common factor in coefficients of a univariate polynomial bounded by the bounding Bézier tetrahedron, and
        associate with each vertex of the triangle unique elements of the partially collapsed tensor as vertex attribute data to be interpolated when rasterizing the triangle;
    an interpolator configured to interpolate the vertices and vertex attribute data across the triangle; and
    a pixel processor configured to:
        reconstruct the partially collapsed symmetric tensor for a pixel within the triangle using the vertex attribute data, compute the coefficients of the univariate polynomial bounded by the bounding Bézier tetrahedron, determine if the three-dimensional surface is visible at the pixel within the triangle in the projected bounding Bézier tetrahedron based on the computed coefficients of the univariate polynomial, and determine color and z-depth information if the three-dimensional surface is visible at the pixel within the triangle.

9. The graphics system of claim 8, wherein the vertex processor is configured to:

obtain the symmetric weight tensor via a blossom of one of the one or more polynomials, transform the symmetric weight tensor to screen space; and compute the partially collapsed symmetric tensor by evaluating the transformed symmetric weight tensor at the vertices of the triangle.

10. The graphics system of claim 8, wherein the pixel processor is configured to terminate processing for the pixel if the three-dimensional surface is not visible at the pixel within the triangle.

11. The graphics system of claim 8, wherein the pixel processor is configured to determine whether roots of the univariant polynomial exist, wherein the three-dimensional surface is not visible at the pixel within the triangle if no real roots of the univariant polynomial exist.

12. The graphics system of claim 11, wherein the pixel processor is configured to translate the univariant polynomial using tensor multiplication.

13. The graphics system of claim 8, wherein a central processing unit acts as the vertex processor.

14. The graphics system of claim 8, wherein a graphics processing unit acts as the vertex processor.

15. A computer-readable storage medium that does not consist of a signal, said computer-readable storage medium storing computer-executable instructions that, when executed by a graphics processing unit of a computer, cause the computer to perform a computer-implemented method for rendering an algebraic surface defined by one or more polynomials bounded by one or more Bézier tetrahedra, the computer-executable instructions comprising:

a pixel shader program configured to compute coefficients of a univariate polynomial at each pixel within a triangle formed by a projection onto planar screen space of one or more of the bounding Bézier tetrahedra and to solve for polynomial roots of the univariate polynomial at each pixel based on the computed coefficients for determining if the algebraic surface at a particular pixel within the triangle exists, wherein:

the pixel shader skips solving for polynomial roots corresponding to a pixel if all coefficients of the univariant polynomial have equivalent signs, the univariant polynomial results from evaluating a multivariant polynomial at the pixel, and the multivariant polynomial describes the algebraic surface within at least one Bézier tetrahedra.

16. The computer-readable storage medium of claim 15, wherein the computer-executable instructions further comprise a rasterizer for interpolating vertex attributes across the triangle.

17. The computer-readable storage medium of claim 16, wherein the vertex attributes comprise unique elements of a partially collapsed tensor and minimum and maximum height values at a vertex.

18. The computer-readable storage medium of claim 15, wherein the pixel shader analytically determines the polynomial roots of the univariant polynomial corresponding to the pixel if all coefficients of the univariant polynomial do not have equivalent signs.

19. The computer-readable storage medium of claim 15 further storing computer-executable instructions directed to:

generating a symmetric tensor via a blossom of a polynomial describing the algebraic surface within at least one of the one or more Bézier tetrahedra;

transforming the symmetric tensor into screen space; and generating a partially collapsed tensor by evaluating the transformed symmetric tensor at one or more vertices of a triangle formed by the projection onto screen space of one of the one or more Bézier tetrahedra.

20. The computer-readable storage medium of claim 15 wherein the pixel shader solves for polynomial roots based on vertex attributes interpolated on a per-pixel basis by a rasterizer executed by the graphics processing unit, the interpolated vertex attributes representing a common factor in coefficients of the polynomial whose roots are being solved by the pixel shader.

* * * * *